United States Patent
Inman et al.

(10) Patent No.: US 10,250,340 B1
(45) Date of Patent: Apr. 2, 2019

(54) WIRELESS RELAY DIRECTIONAL TESTING

(71) Applicant: Sprint Communications Company L.P., Overland Park, KS (US)

(72) Inventors: Dwight Devan Inman, Travelers Rest, SC (US); Raymond Emilio Reeves, Oviedo, FL (US); Calvin D. Mayfield, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 146 days.

(21) Appl. No.: 15/443,127

(22) Filed: Feb. 27, 2017

(51) Int. Cl.
| H04L 12/26 | (2006.01) |
| H04B 17/16 | (2015.01) |
| H04W 4/06 | (2009.01) |
| H04B 17/336 | (2015.01) |
| H04W 76/27 | (2018.01) |

(52) U.S. Cl.
CPC .......... *H04B 17/16* (2015.01); *H04B 17/336* (2015.01); *H04W 4/06* (2013.01); *H04W 76/27* (2018.02)

(58) Field of Classification Search
CPC ..... H04W 76/27; H04W 4/06; H04W 76/046; H04B 17/16; H04B 17/336
See application file for complete search history.

(56) References Cited

U.S. PATENT DOCUMENTS

| 6,253,060 B1 | 6/2001 | Komara et al. |
| 6,748,212 B2 | 6/2004 | Schmutz et al. |
| 7,085,592 B1 * | 8/2006 | Davies ...................... H01Q 3/08 343/703 |
| 7,142,107 B2 | 11/2006 | Kates |
| 7,193,966 B2 | 3/2007 | Gupta et al. |
| 8,265,619 B1 | 9/2012 | Hyde et al. |
| 8,743,713 B2 | 6/2014 | Terry |
| 9,294,250 B2 | 3/2016 | Seo et al. |
| 9,391,805 B2 | 7/2016 | Wang et al. |
| 9,811,445 B2 * | 11/2017 | Moretto .............. G06F 11/3672 |
| 2008/0039012 A1 | 2/2008 | McKay et al. |
| 2010/0054134 A1 * | 3/2010 | Briand .................... H04L 43/50 370/241 |
| 2012/0015662 A1 | 1/2012 | Zhang et al. |
| 2016/0021672 A1 * | 1/2016 | Delsol ................... H04W 24/06 455/450 |
| 2016/0150426 A1 | 5/2016 | Panaitopol |
| 2016/0353337 A1 * | 12/2016 | Zhu .................. H04W 36/0055 |

FOREIGN PATENT DOCUMENTS

| CN | 101873625 | 10/2010 |
| WO | 2001048942 | 7/2001 |

* cited by examiner

*Primary Examiner* — Stephen M D Agosta

(57) ABSTRACT

A wireless relay performs Radio Frequency (RF) testing at geographic azimuths. In the wireless relay, a wireless access point wirelessly exchanges user data with wireless user devices and exchanges the user data with Relay Equipment (RE). In the wireless relay, the RE exchanges the user data with the wireless access point and wirelessly exchanges the user data with a wireless communication network. The RE wirelessly receives a directional RF test instruction indicating geographic azimuths. The RE performs a directional RF test at the geographic azimuths based on the directional RF test instruction. The RE transfers RF test results for the geographic azimuths to the wireless communication network.

14 Claims, 5 Drawing Sheets

WIRELESS RELAY DIRECTIONAL TESTING

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Wireless communication networks are deployed to extend the range and mobility of these data communication services.

The typical wireless communication network has several macro-cell base stations that provide radio coverage over large urban areas. The macro-cell base stations may still not be able to cover every part of the urban area with enough capacity. Outside of the urban areas, the macro-cell base stations may be too large for environments like inter-state highways and smaller towns. Wireless relays are deployed to alleviate these problems.

A wireless relay has a wireless access point to wirelessly communicate with user devices. The wireless relay also has wireless Relay Equipment (RE) to wirelessly communicate with macro-cell base stations or other wireless relays. Thus, the macro-cell base stations serve both user devices and wireless relays. The wireless relays serve both user devices and wireless relays. The REs in the relays have directional wireless communication components that detect RF conditions at various geographic azimuths. For example, an RE can scan for signal strength in an azimuth range from the zero degrees (north) to ninety degrees (east).

Network elements like wireless relays are often remotely configured to perform RF testing. The RF testing includes the detection of RF signal strength, noise, and interference. Unfortunately, the wireless relays do not effectively and efficiently perform specific RF tests at specific directional azimuths in a dynamic manner.

TECHNICAL OVERVIEW

A wireless relay performs Radio Frequency (RF) testing at geographic azimuths. In the wireless relay, a wireless access point wirelessly exchanges user data with wireless user devices and exchanges the user data with Relay Equipment (RE). In the wireless relay, the RE exchanges the user data with the wireless access point and wirelessly exchanges the user data with a wireless communication network. The RE wirelessly receives a directional RF test instruction indicating geographic azimuths. The RE performs a directional RF test at the geographic azimuths based on the directional RF test instruction. The RE transfers RF test results for the geographic azimuths to the wireless communication network.

DETAILED DESCRIPTION

Figure 1:
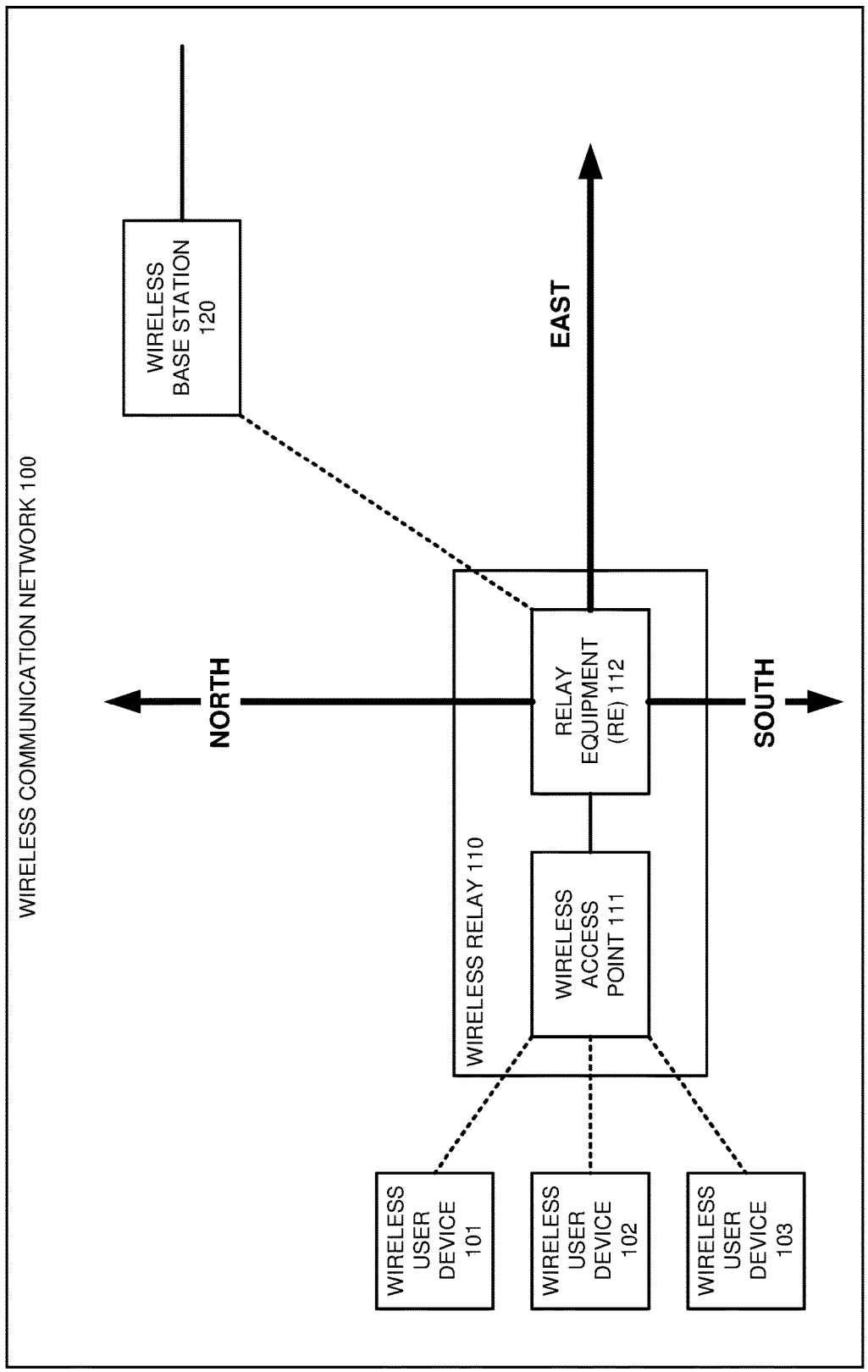
FIGS. 1-2 illustrate a wireless communication network with a wireless relay that performs directional Radio Frequency (RF) testing.
Figure 2:
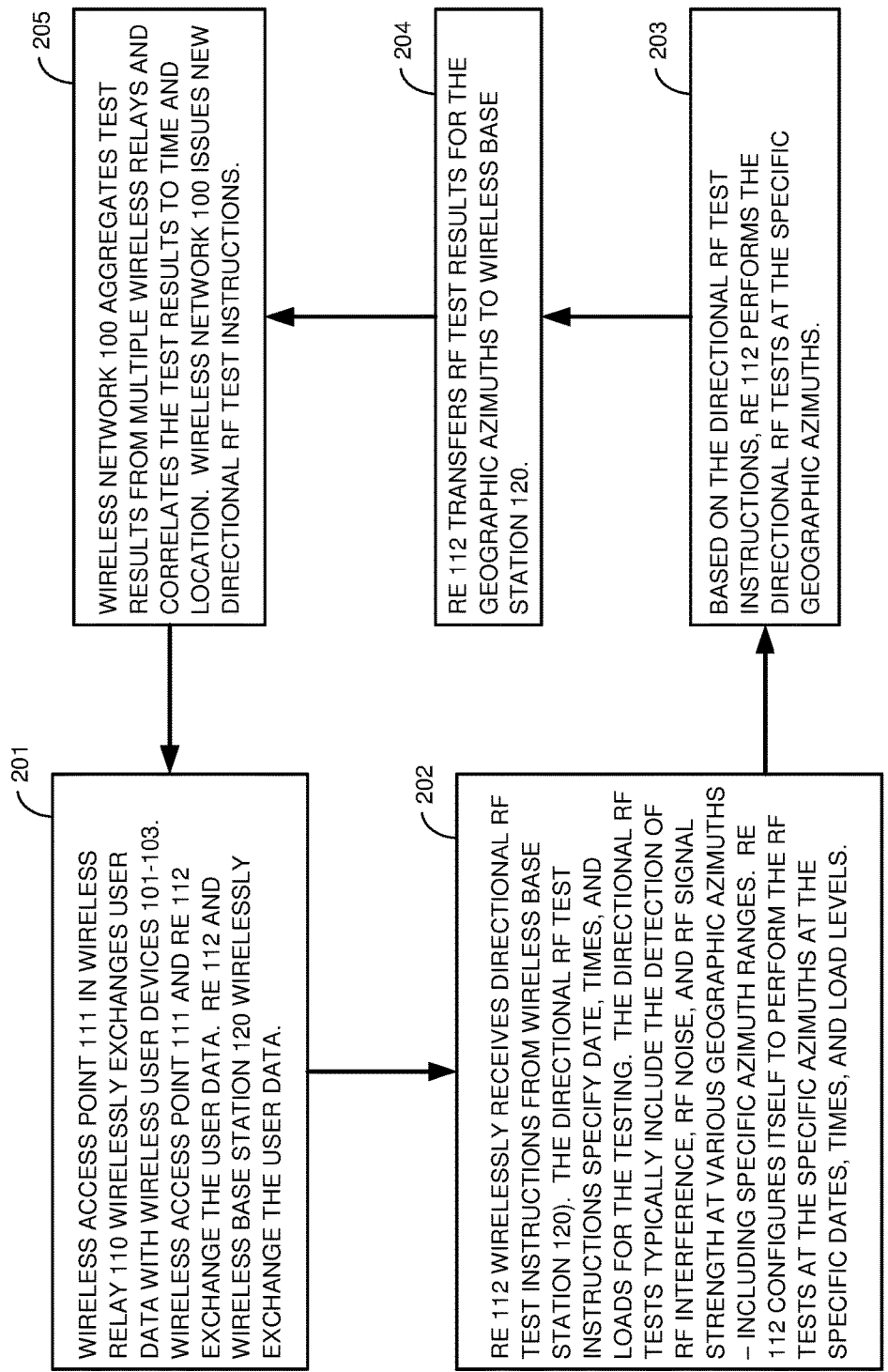

FIGS. 1-2 illustrate wireless communication network 100 with wireless relay 110 that performs directional Radio Frequency (RF) testing. Wireless communication network 100 exchanges user data for wireless user devices 101-103. Wireless user devices 101-103 comprise computers, phones, or some other intelligent machines with RF communication components. The user data exchanges support data services such as content streaming, media conferencing, machine communications, internet access, or some other computerized information service.

Referring to FIG. 1, wireless communication network 100 comprises wireless user devices 101-103, wireless relay 110, and wireless base station 120. Wireless base station 120 could be an evolved NodeB, wireless relay, wireless repeater, or some other intelligent machine with RF communication components. Wireless relay 110 comprises wireless access point 111 and Relay Equipment (RE) 112.

Wireless access point 111 and RE 112 are each made of computer hardware like Central Processing Units (CPUs), Random Access Memory (RAM), persistent data storage, bus interfaces, and data transceivers. The data communication transceivers include antennas, amplifiers, filters, and digital signal processors for wireless data communication. These wireless communication components can detect RF signals from specific geographic azimuths. Wireless access point 111 and RE 112 also have computer software like operating systems, baseband modules, networking modules, test applications, and network applications.

Wireless access point 111 wirelessly exchanges user data with wireless user devices 101-103. Wireless access point 111 and RE 112 exchange the user data. RE 112 and wireless base station 120 wirelessly exchange the user data. Wireless base station 120 exchanges the user data with other network systems.

On FIG. 1, a north arrow indicates the geographic azimuth of zero degrees at RE 112. East and south arrows indicate respective geographic azimuths of 90 degrees and 180 degrees at RE 112. The west arrow at the geographic azimuth of 270 degrees is omitted for clarity. RE 112 wirelessly receives directional RF test instructions from wireless base station 120. The directional RF test instructions indicate RF tests at specific geographic azimuths. For example, a directional RF test instruction may request an RF interference scan from 225-240 degrees (southwest).

The test instructions may also indicate additional tests like measuring data throughput, data error rates, data latency, and data jitter. In some examples, RE 112 wirelessly receives a Uniform Resource Indicator (URI) from wireless base station 120, and RE 112 uses the URI to retrieve the complete directional RF test instructions from a test server. RE 112 may receive the directional RF test instructions (or its URI) over a Radio Resource Control (RRC) message, Non-Access Stratum (NAS) message, S1-MME message, or some other data transfer to wireless relay 110.

Based on the directional RF test instructions, RE 112 performs the directional RF tests at the specific geographic azimuths. The directional RF tests might comprise detecting RF interference, RF noise, and RF signal strength at specific geographic azimuths. The specific geographic azimuths nay comprise specific azimuth ranges like an azimuth range of 30-60 degrees.

The directional RF test instruction may specify a date and time for the testing. RE 112 would configure itself to perform the RF test at the specific azimuths at the specific date and time. The directional RF test instruction may specify a user load for the testing. For example, the test instruction may indicate an idle-mode test, and RE 112 would configure itself to perform the RF test at the specific azimuths when idle-mode is reached. The test instruction may indicate a load-bearing test, and RE 112 would configure itself to perform the RF test at the specific azimuths when a high-level of usage is reached.

RE 112 transfers RF test results for the geographic azimuths to wireless base station 120. Wireless base station 120 forwards the RF test results to the test server in wireless communication network 100. The test server correlates the test results in time and maps the test results to geographic location. Using the directional test results of multiple wireless relays, the test server may identify both desirable signal sources and unwanted sources of interference and noise.

Referring to FIG. 2, the operation of wireless relay 110 is described. Wireless access point 111 in wireless relay 110 wirelessly exchanges user data with wireless user devices 101-103 (201). Wireless access point 111 and RE 112 exchange the user data (201). RE 112 and wireless base station 120 wirelessly exchange the user data (201). RE 112 wirelessly receives directional RF test instructions from wireless base station 120 (202). The directional RF test instructions specify date, times, and loads for the testing. The directional RF test instructions indicate test types like the detection of RF interference, RF noise, and RF signal strength. The directional RF test instructions indicate the geographic azimuths for the tests including azimuth ranges. RE 112 configures itself to perform the specific RF tests at the specific azimuths at the specific dates, times, and load levels (202). Based on the directional RF test instructions, RE 112 performs the specific directional RF tests at the specific geographic azimuths (203). RE 112 transfers RF test results for the geographic azimuths to wireless base station 120 (204).

The test server in wireless network 100 aggregates the test results from multiple wireless relays and correlates the aggregates results in time. The test server maps the aggregated and correlated test results to geographic location. The test server also transmits new RF test instructions to the wireless relays.

Figure 3:
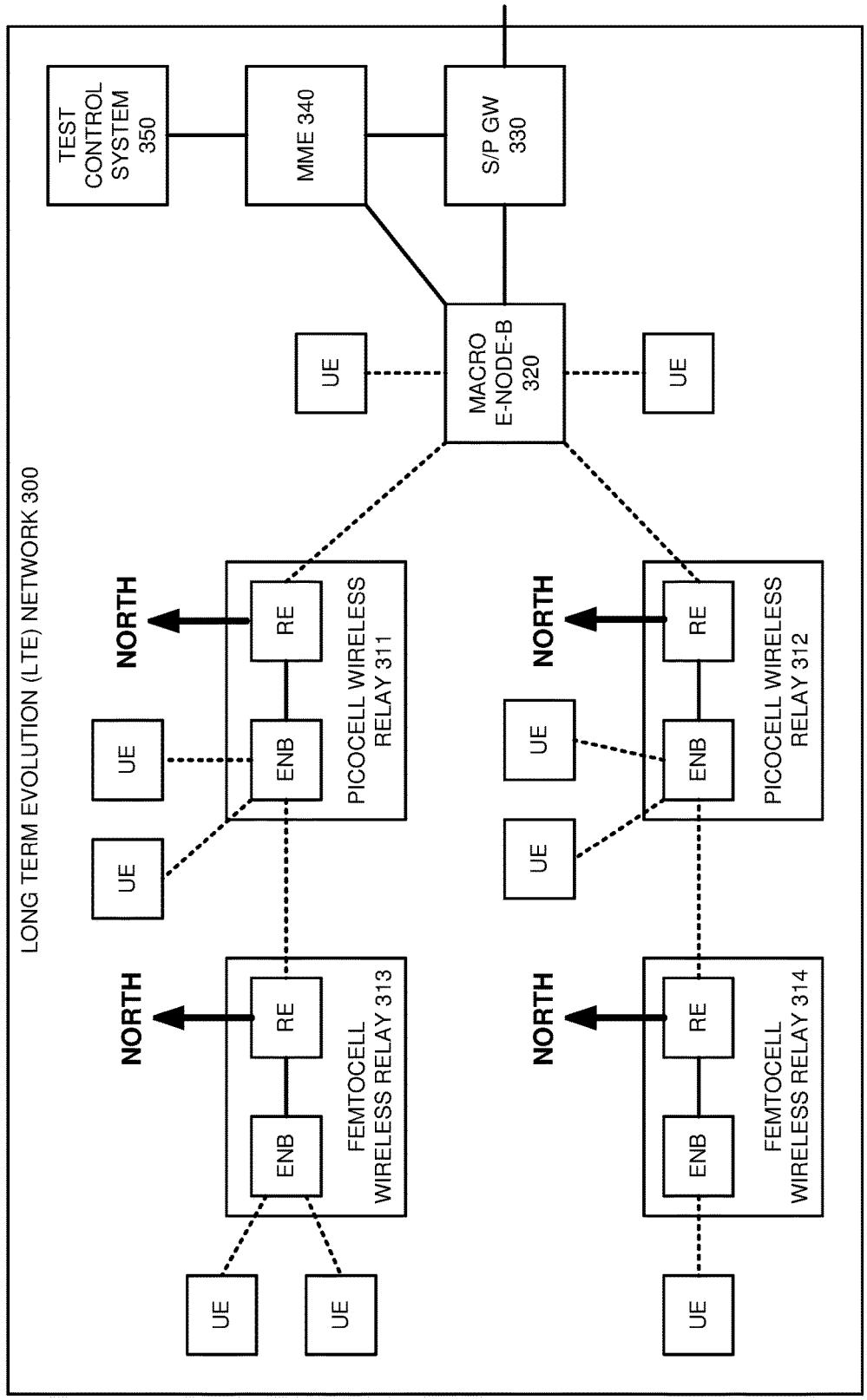
FIG. 3 illustrates a Long Term Evolution (LTE) network with femto-cell and pico-cell wireless relays that perform directional RF testing.

FIG. 3 illustrates Long Term Evolution (LTE) network 300 with femto-cell and pico-cell wireless relays 311-314 to perform directional RF testing. LTE network 300 comprises User Equipment (UEs), femto-cell wireless relays 311-312, pico-cell wireless relays 313-314, macro-cell eNodeB 320, Serving and Packet Data Network Gateways (S/P GWs) 330, Mobility Management Entity (MME) 340, and test control system 350. Wireless relays 311-314 each comprise an eNodeB (ENB) and Relay Equipment (RE). A north arrow indicates the geographic azimuth of zero degrees at each RE.

The UEs wirelessly exchange user data with macrocell eNodeB 320 and the ENBs in wireless relays 311-314. Femto-cell wireless relay 313 and pico-cell wireless relay 311 exchange wireless user data. Femto-cell wireless relay 314 and pico-cell wireless relay 312 exchange wireless user data. Pico-cell wireless relays 311-312 and macro-cell eNodeB 320 exchange the wireless user data. Macro-cell eNodeB 320 and S/P-GWs 330 exchange the user data, and S/P-GWs 330 exchange the user data with other systems.

Test control system 350 generates RF test instructions for individual wireless relays 311-314. The RF test instructions specify individual test types like signal strength, interference, and noise detection. The RF test instructions also specify test azimuths for each test, such as azimuth degree ranges: 0-30, 30-60, 60-90, 90-120, 120-150, 150-180, 180-210, 210-240, 240-270, 270-300, 300-330, and 330-0. Test control system 350 associates a URI with the directional test instructions for each wireless relay. Test control system 350 transfers the URIs to wireless relays 311-314, and wireless relays 311-314 download their own directional test instructions from test control system 350 using their own URI.

In wireless relays 311-314, the REs receive the directional RF test instructions from test control system 350. The REs may receive the test instructions through eNodeB 320 over Radio Resource Control (RRC) messages. The REs may receive the test instructions through MME 340 in Non-Access Stratum (NAS) messages. The ENBs in wireless relays 311-314 may receive the test instructions through MME 340 in S1-MME messages and then transfer the test instructions to their co-located REs. The test instructions may also indicate additional tests like data throughput, data error rates, data latency, and data jitter.

Based on the directional RF test instructions, the REs perform the directional RF tests at the specific geographic azimuths. The directional RF test instructions specify date, times, and/or UE load that trigger each test. For example, an RF test could be triggered when a wireless relay enters idle-mode during a specific time-frame on a given day of the week. The REs perform the directional RF tests and any other specified tests at the designated test azimuths, times, and loads.

The REs transfer their RF test results to test control system 350. Test control system 350 aggregates the test results from the wireless relays 311-314. Test control system 350 correlates the aggregated RF test results in time and maps the aggregated and correlated test results to their geographic location and azimuth. For example, a source of noise may be detected by mapping noisy azimuths from wireless relays 311-314 to an intersection that represents the noise source.

Figure 4:
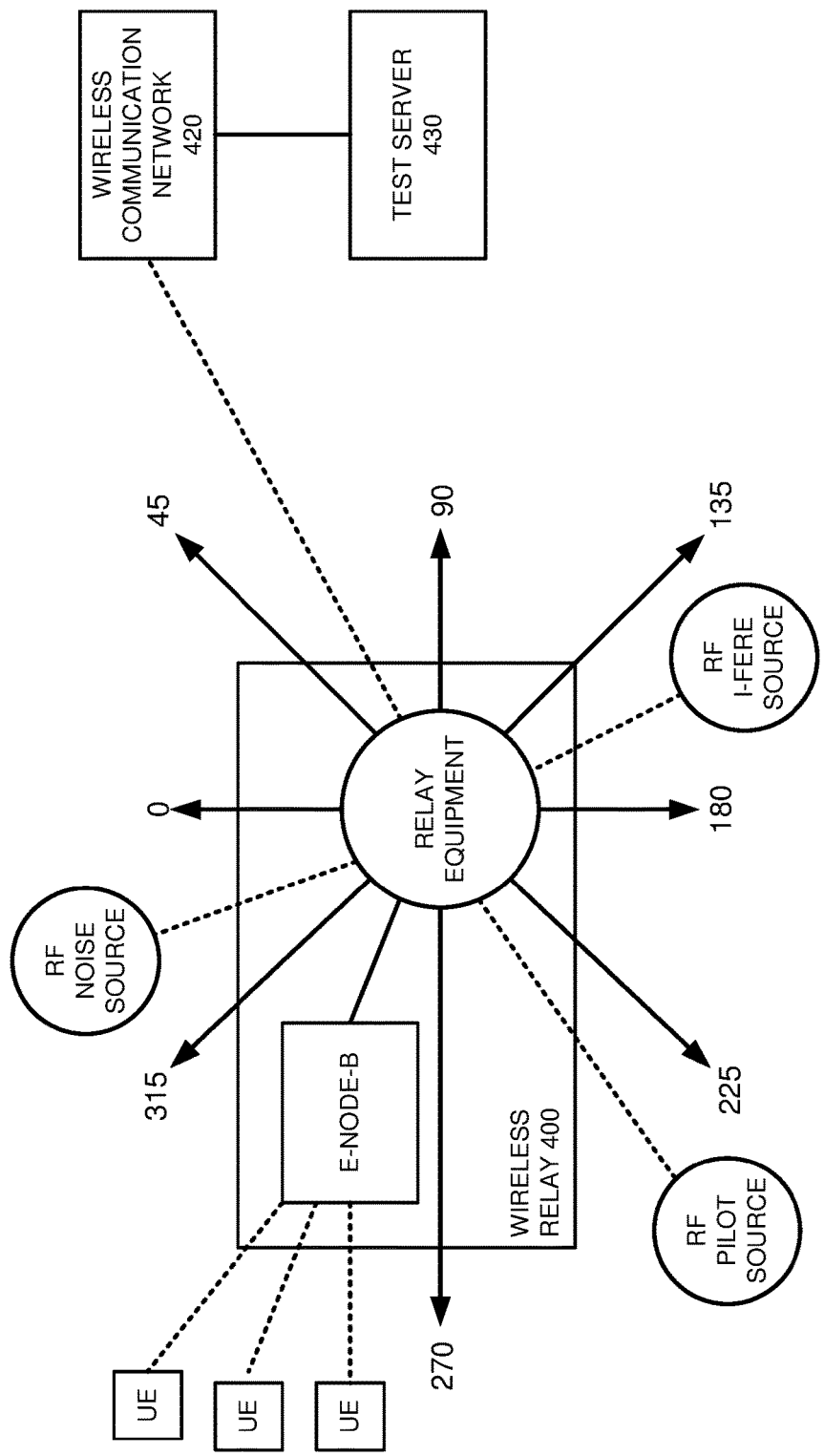
FIG. 4 illustrates a wireless relay to perform directional RF testing.

FIG. 4 illustrates wireless relay 400 to perform directional RF testing. Wireless relay 400 comprises relay equipment and an eNodeB that are coupled over a data link like Ethernet. Azimuth degrees from the relay equipment are indicated by various arrows. UEs wirelessly exchange user data with the eNodeB in wireless relay 400. The eNodeB exchanges the user data with the relay equipment. The relay equipment wirelessly exchanges the user data with wireless communication network 420.

Test server 430 generates directional RF test instructions for wireless relay 400. The directional RF test instructions specify individual tests to detect RF signal strength, interference, and noise. The RF test instructions specify azimuth ranges for each test. For example, the test instructions may require three RF noise detection tests at azimuth ranges 270-315, 315-0, and 0-45. The test instructions may require two RF interference detection tests at azimuth ranges 90-135 and 135-180. The test instructions may require 12 RF signal strength detection tests at azimuth ranges 0-30, 30-60, 60-90, 90-120, 120-150, 150-180, 180-210, 210-240, 240-270, 270-300, 300-330, and 330-0.

Test server 430 associates a URI with the directional test instructions for wireless relay 400. Test control system 430 transfers the URI to the relay equipment in wireless relay 400, and the relay equipment downloads its directional test instructions from test server 430 using its URI. The test instructions may indicate additional tests like data throughput, data error rates, data latency, and data jitter.

Based on the directional RF test instructions, the relay equipment performs the directional RF tests at the specific geographic azimuths. The directional RF test instructions may specify a date, time, and/or UE load that triggers each test. For example, an RF test could be triggered if the relay equipment in wireless relay 400 enters idle-mode during a busy-hour on a work day. The REs perform the directional RF tests and any other specified tests at the designated test azimuths, times, and loads.

In this example, the relay equipment detects excessive RF noise at 335 degrees during the noise scan of azimuth range 315-0. The relay equipment detects excessive RF interference at 155 degrees during the interference scan of azimuth range 135-180. The relay equipment detects a strong pilot signal at 235 degrees during the signal strength scan of azimuth range 210-240. The relay equipment transfers its RF test results to test server 430. Test server 430 aggregates the test results from wireless relay 400 with the test results of other wireless relays. Test server 430 correlates the aggregated RF test results in time and maps the aggregated and correlated test results to their geographic location and azimuth. Thus, the test results of multiple wireless relays at the same time automatically detects sources of noise, interference, and signal strength.

Figure 5:
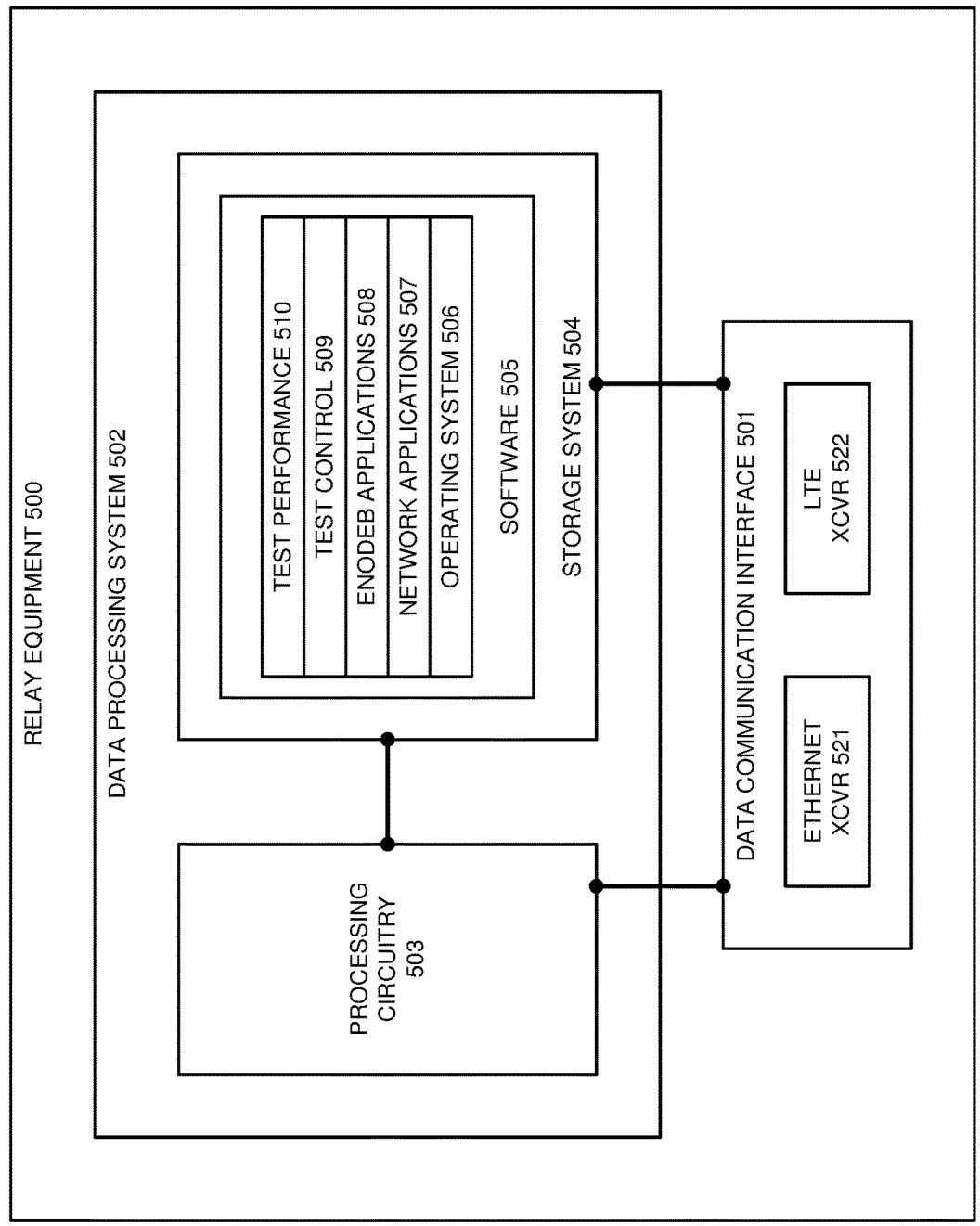
FIG. 5 illustrates wireless relay equipment to perform directional RF testing.

FIG. 5 illustrates relay equipment 500 to perform directional RF testing. Relay equipment 500 is an example of the REs described above, although this equipment may use alternative configurations and operations. Relay equipment 500 comprises data communication interface 501 and data processing system 502. Data communication interface 501 comprises Ethernet transceiver 521 and Long Term Evolution (LTE) transceiver 522. Data processing system 502 comprises processing circuitry 503 and storage system 504. Storage system 504 stores software 505. Software 505 includes respective software modules 506-510.

Ethernet transceiver 521 comprises communication components, such as ports, bus interfaces, signal processors, memory, software, and the like. LTE transceiver 522 comprises communication components, such as antennas, amplifiers, filters, modulators, signal processors, ports, bus interfaces, memory, software, and the like. LTE transceiver 522 can detect RF noise, interference, and signal strength. LTE transceiver 522 has directional RF antennas and signal processing and to detect RF signals, noise and interference at specific azimuths and azimuth ranges.

Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

Relay equipment 500 may be centralized or distributed. All or portions of software 506-510 may be externally stored on one or more storage media, such as circuitry, discs, and the like. Some conventional aspects of relay equipment 500 are omitted for clarity, such as power supplies, enclosures, and the like. When executed by processing circuitry 503, software modules 506-510 direct circuitry 503 to perform the following operations.

Operating system 506 interfaces between software modules 507-510 and the relay equipment hardware (processing circuitry 503, data communication interface 501, RAM, storage). Network applications 507 control network RF protocols for network access. eNodeB applications 508 interacts with the eNodeB that is co-located in the wireless relay. Test control 509 receives directional RF test instructions and configures test performance 510. Test performance 510 drives operating system 506 and network applications 507 to perform specific RF tests at specified azimuths using LTE transceiver 522.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay comprising a wireless access point and Relay Equipment (RE) to perform Radio Frequency (RF) testing at geographic azimuths, the method comprising:
   the wireless access point wirelessly exchanging user data with wireless user devices;
   the wireless access point and the RE exchanging the user data;
   the RE wirelessly exchanging the user data with a wireless communication network;
   the RE wirelessly receiving a directional Radio Frequency (RF) test instruction indicating one or more of the geographic azimuths, wherein the directional RF test instruction comprises detecting RF signal strength at a specified date and time, and wherein at least a portion of the directional RF test instruction is wirelessly received by the RE in a Radio Resource Control (RRC) message;
   the RE performing a directional RF test at the one or more geographic azimuths based on the directional RF test instruction; and
   the RE transferring RF test results for the one or more geographic azimuths to the wireless communication network.

2. The method of claim 1 wherein the directional RF test further comprises detecting RF interference at a specific one of the geographic azimuths.

3. The method of claim 1 wherein the directional RF test further comprises detecting RF noise at a specific one of the geographic azimuths.

4. The method of claim 1 wherein the RE performing the directional RF test based on the directional RF test instruction further comprises performing the directional RF test at a specified user load on the wireless access point.

5. The method of claim 1 wherein at least an additional portion of the directional RF test instruction is wirelessly received by the RE using a Uniform Resource Indicator (URI) and wherein the directional RF test instruction is retrieved using the URI.

6. The method of claim 1 wherein at least an additional portion of the directional RF test instruction is wirelessly received by the RE in a in a Non-Access Stratum (NAS) message.

7. The method of claim 1 wherein at least an additional portion of the directional RF test instruction is wirelessly received by the wireless access point in an S1-MME message and wherein the additional portion of the directional RF test instruction is transferred to the RE.

8. The method of claim 1 wherein the RE is further configured to perform the directional RF test at a specified user load on the wireless access point.

9. The method of claim 1 wherein at least an additional portion of the directional RF test instruction is wirelessly received by the RE using a Uniform Resource Indicator (URI) and wherein the directional RF test instruction is retrieved using the URI.

10. The method of claim 1 wherein at least an additional portion of the directional RF test instruction is wirelessly received by the RE in a in a Non-Access Stratum (NAS) message.

11. The method of claim 1 wherein at least an additional portion of the directional RF test instruction is wirelessly received by the wireless access point in an S1-MME message and wherein the additional portion of the directional RF test instruction is transferred to the RE.

12. A wireless relay comprising a wireless access point and Relay Equipment (RE) to perform Radio Frequency (RF) testing at geographic azimuths comprising:
   the wireless access point configured to wirelessly exchange user data with wireless user devices and exchange the user data with the RE;
   the RE configured to exchange the user data with the wireless access point and wirelessly exchange the user data with a wireless communication network;
   the RE configured to wirelessly receive a directional Radio Frequency (RF) test instruction indicating one or more of the geographic azimuths, wherein the directional RF test instruction comprises detecting RF signal strength at a specified date and time, and wherein at least a portion of the directional RF test instruction is wirelessly received by the RE in a Radio Resource Control (RRC) message; and
   the RE configured to perform a directional RF test at the one or more geographic azimuths based on the directional RF test instruction and transfer RF test results for the one or more geographic azimuths to the wireless communication network.

13. The wireless relay of claim 12 wherein the RE is further configured to detect RF interference at a specific one of the geographic azimuths.

14. The wireless relay of claim 12 wherein the RE is further configured to detect RF noise at a specific one of the geographic azimuths.

* * * * *